(12) United States Patent
van Vredendaal et al.

(10) Patent No.: US 12,388,654 B2
(45) Date of Patent: Aug. 12, 2025

(54) METHOD FOR SUPERFLOUS HASH USAGE IN HASH-BASED SIGNATURES

(71) Applicant: NXP B.V., Eindhoven (NL)

(72) Inventors: Christine van Vredendaal, Veldhoven (NL); Joppe Willem Bos, Wijgmaal (BE)

(73) Assignee: NXP B.V., Eindhoven (NL)

( * ) Notice: Subject to any disclaimer, the term of this patent is extended or adjusted under 35 U.S.C. 154(b) by 343 days.

(21) Appl. No.: 18/069,929

(22) Filed: Dec. 21, 2022

(65) Prior Publication Data

US 2024/0223380 A1 Jul. 4, 2024

(51) Int. Cl.
*H04L 9/32* (2006.01)
*H04L 9/00* (2022.01)

(52) U.S. Cl.
CPC ........... *H04L 9/3247* (2013.01); *H04L 9/50* (2022.05)

(58) Field of Classification Search
CPC .............................. H04L 9/3247; H04L 9/50
See application file for complete search history.

(56) References Cited

U.S. PATENT DOCUMENTS

| | | | |
|---|---|---|---|
| 8,538,014 B2 | 9/2013 | Perlman | |
| 8,924,975 B2 | 12/2014 | Memik | |
| 9,747,458 B2 | 8/2017 | Jakobsson | |
| 2009/0199010 A1* | 8/2009 | Hakuta | H04L 9/3247 713/176 |
| 2019/0319782 A1 | 10/2019 | Ghosh | |
| 2019/0319799 A1 | 10/2019 | Suresh | |
| 2019/0319802 A1 | 10/2019 | Misoczki | |
| 2022/0100873 A1* | 3/2022 | Yoon | G06F 21/575 |
| 2022/0200787 A1* | 6/2022 | Kostman | H04L 9/0618 |
| 2022/0376892 A1* | 11/2022 | Bos | H04L 9/3236 |

OTHER PUBLICATIONS

Russ Housley, Use of the HSS/LMS Hash-Based Signature Algorithm in the Cryptographic Message Syntax (CMS), RFC 8708, Feb. 2020.
Andreas Huelsing, Denis Butin, Stefan-Lukas Gazdag, Joost Rijneveld, and Aziz Mohaisen, XMSS: eXtended Merkle Signature Scheme, RFC 8391, May 2018.

(Continued)

*Primary Examiner* — Catherine Thiaw
*Assistant Examiner* — Daniel Elahian

(57) ABSTRACT

Various embodiments relate to a data processing system comprising instructions embodied in a non-transitory computer readable medium, the instructions for digital signature method based in a processor, the instructions, including: performing $p_1/k$ iterations of a parallel chained hash function for a first signature calculation, wherein $p_1$ is the total number of chained hashes to be calculated for the first signature and k is the number of parallel hashes performed by the parallel chained hash function; performing a parallel chained hash function on remaining remainder($p_1/k$) chained hashes from the first signature calculation and X=k−remainder($p_1/k$) chained hashes from a second signature calculation; and performing ($p_2$−X)/k iterations of a (Continued)

parallel chained hash function for the second signature calculation, wherein $p_2$ is the total number of chained hashes to be calculated for the second signature.

20 Claims, 4 Drawing Sheets

(56) References Cited

OTHER PUBLICATIONS

Andreas Hülsing, W-OTS+—Shorter Signatures for Hash-Based Signature Schemes, Progress in Cryptology—AFRICACRYPT 2013 (Amr Youssef, Abderrahmane Nitaj, and Aboul-Ella Hassanien, eds.), vol. 7918, 2013, pp. 173-188.

Andreas Hülsing, Joost Rijneveld, and Fang Song, Mitigating Multi-target Attacks in Hash-Based Signatures, PKC 2016 (Chen-Mou Cheng, Kai-Min Chung, Guiseppe Persiano, and Bo-Yin Yang, eds.), vol. 9614, 2016, pp. 387-416.

Vinay B. Y. Kumar, Naina Gupta, Anupam Chattopadhyay, Michael Kasper, Christoph Krauß, and Ruben Niederhagen, Post-quantum secure boot, 2020 Design, Automation Test in Europe Conference Exhibition (DATE), 2020, pp. 1582-1585.

Ralph C. Merkle, A Certified Digital Signature, Advances in Cryptology—Crypto (Gilles Brassard, ed.), vol. 435, Springer, 1989, pp. 218-238.

National Institute of Standards and Technology, Post-quantum cryptography standardization, ttps: / / csrc. nist . gov / Pro j acts/Post-Quantum-Cryptography/Post-Quantum-Cryptography-Standardization.

Jan Philipp Thoma and Tim Güneysu, A configurable hardware implementation of xmss, Cryptology ePrint Archive, Paper 2021/352, 2021, https: //eprint. iacr. org/2021/352.

Wen Wang, Bernhard Jungk, Julian Walde, Shuwen Deng, Naina Gupta, Jakub Szefer, and Ruben Niederhagen, Xmss and embedded systems, Selected Areas in Cryptography—SAC 2019 (Cham) (Kenneth G. Paterson and Douglas Stebila, eds.), Springer International Publishing, 2020, pp. 523-550.

U.S. Appl. No. 17/901,546; "A Lightweight Fault Countermeasure for Stateful Hash-based Cryptography"; Filed Sep. 1, 2022; Inventors: Christine van Vredendaal, et al.

* cited by examiner

METHOD FOR SUPERFLOUS HASH USAGE IN HASH-BASED SIGNATURES

TECHNICAL FIELD

Various exemplary embodiments disclosed herein relate generally to a method for superfluous hash usage in hash-based signatures.

BACKGROUND

Digital signatures are of vital importance to our cryptographic infrastructure. For example, they underpin the authentication infrastructure in the form of digital certificates on the internet, which is shifting more and more to resource-constrained devices in the Internet of Things (IoT). In order to make digital signatures accessible to such small devices, it is important to minimize the resource requirements and optimize the efficiency of the involved algorithms (e.g., key generation, signing, and verification).

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a data processing system including instructions embodied in a non-transitory computer readable medium, the instructions for digital signature method based in a processor, the instructions, including: performing $p_1/k$ iterations of a parallel chained hash function for a first signature calculation, wherein $p_1$ is a total number of chained hashes to be calculated for the first signature and k is the number of parallel hashes performed by the parallel chained hash function; performing a parallel chained hash function on remaining remainder($p_1/k$) chained hashes from the first signature calculation and X=k−remainder($p_1/k$)chained hashes from a second signature calculation; and performing ($p_2$−X)/k iterations of a parallel chained hash function for the second signature calculation, wherein $p_2$ is a total number of chained hashes to be calculated for the second signature.

Various embodiments are described, further including instructions for: performing a parallel chained hash function on remaining remainder($p_2/k$) chained hashes from the second signature calculation and X=k−remainder($p_2/k$) chained hashes from a third signature calculation.

Various embodiments are described, further including loading the X chained hashes from the second signature calculation before performing ($p_2$−X)/k iterations of a parallel chained hash function for the second signature calculation.

Various embodiments are described, further including combining the X chained hashes from the second signature calculation and storing the combination of the X chained hashes from the second signature calculation.

Various embodiments are described, further including loading the combined X chained hashes from the second signature calculation before performing ($p_2$−X)/k iterations of a parallel chained hash function for the second signature calculation.

Various embodiments are described, wherein the digital signature implements a hash-based signature using a graph structure and a one-time signature scheme.

Various embodiments are described, wherein performing the chained parallel hash function includes: receiving a single instruction and a plurality of small data inputs, wherein the single instruction instructs a processor to perform a parallel chained hash operation on the plurality of small data inputs; for each of the small data inputs in parallel computing a chained hash function on the small data inputs, wherein in the chained has function includes a plurality of rounds: applying the hash functions to each of the small data inputs in a first round to produce an output; and applying the hash functions to the output of a previous round in a second to last round.

Further various embodiments relate to a digital signature method, including: performing $p_1/k$ iterations of a parallel chained hash function for a first signature calculation, wherein $p_1$ is a total number of chained hashes to be calculated for the first signature and k is the number of parallel hashes performed by the parallel chained hash function; performing a parallel chained hash function on remaining remainder($p_1/k$) chained hashes from the first signature calculation and X=k−remainder($p_1/k$) chained hashes from a second signature calculation; and performing ($p_2$−X)/k iterations of a parallel chained hash function for the second signature calculation, wherein $p_2$ is a total number of chained hashes to be calculated for the second signature.

Various embodiments are described, further including: performing a parallel chained hash function on remaining remainder($p_2/k$) chained hashes from the second signature calculation and X=k−remainder($p_2/k$) chained hashes from a third signature calculation.

Various embodiments are described, further including loading the X chained hashes from the second signature calculation before performing ($p_2$−X)/k iterations of a parallel chained hash function for the second signature calculation.

Various embodiments are described, further including combining the X chained hashes from the second signature calculation and storing the combination of the X chained hashes from the second signature calculation.

Various embodiments are described, further including loading the combined X chained hashes from the second signature calculation before performing ($p_2$−X)/k iterations of a parallel chained hash function for the second signature calculation.

Various embodiments are described, wherein the digital signature implements a hash-based signature using a graph structure and a one-time signature scheme.

Various embodiments are described, wherein performing the chained parallel hash function includes: receiving a single instruction and a plurality of small data inputs, wherein the single instruction instructs a processor to perform a parallel chained hash operation on the plurality of small data inputs; for each of the small data inputs in parallel computing a chained hash function on the small data inputs, wherein in the chained has function includes a plurality of rounds: applying the hash functions to each of the small data inputs in a first round to produce an output; and applying the hash functions to the output of a previous round in a second to last round.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
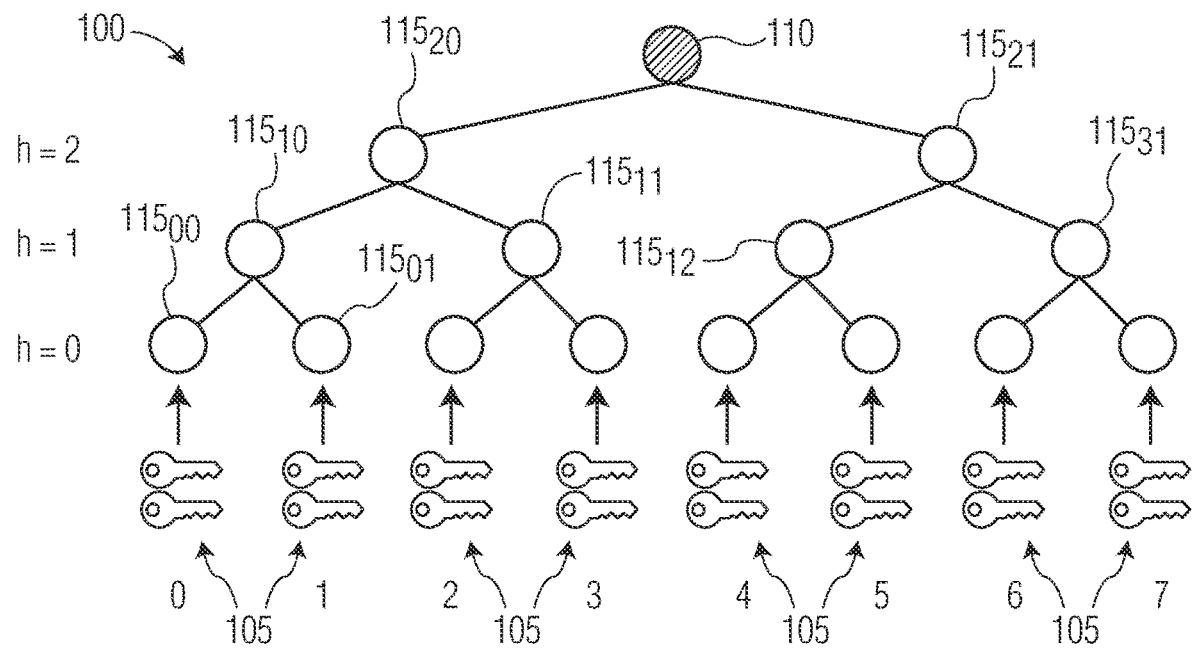
FIG. 1 illustrates a tree corresponding to 8 OTS public-private key pairs.

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Digital signatures are of vital importance to our cryptographic infrastructure. For example, they underpin the authentication infrastructure in the form of digital certificates on the internet, which is shifting more and more to resource-constrained devices in the Internet of Things (IoT). In order to make digital signatures accessible to such small devices, it is important to minimize the resource requirements and optimize the efficiency of the involved algorithms (e.g., key generation, signature generation and signature verification).

The most commonly used signature schemes are RSA and variants of (EC)DSA. However, with the possibility of a quantum computer being realized, the security of RSA and (EC)DSA is threatened. The idea of hash-based signatures dates back to a proposal by Ralph Merkle from the late 1970's (see Ralph C. Merkle, *A Certified Digital Signature*, Advances in Cryptology—CRYPTO (Gilles Brassard, ed.), vol. 435, Springer, 1989, pp. 218-238.). Hash-based signatures rely on a graph structure in which nodes correspond to public keys of One-Time Signature (OTS) schemes, which are in turn constructed using hash functions. The security of this approach therefore relies on the cryptographic strength of the hash function used and the pseudo-random function family: cryptographic primitives which are well-studied, understood, and not known to be broken by quantum computers.

XMSS has matured since its original publication (see Andreas Hülsing, Joost Rijneveld, and Fang Song, *Mitigating Multi-target Attacks in Hash-Based Signatures*, PKC 2016 (Chen-Mou Cheng, Kai-Min Chung, Guiseppe Persiano, and Bo-Yin Yang, eds.), vol. 9614, 2016, pp. 387-416.), resulting in the scheme described in RFC 8391 (see Andreas Hülsing, Denise Butin, Stefan-Lukas Gazdag, Joost Rijneveld, and Aziz Mohaisen, *XMSS: Extended Hash-Based Signatures*. RFC 8391, 2018). RFC 3291 uses WOTS⁺ as OTS, which are described herein in the context of XMSS (see Andreas Hülsing, *W-OTS+—Shorter Signatures for Hash-Based Signature Schemes*, Progress in Cryptology—AFRICACRYPT 2013 (Amr Youssef, Abderrahmane Nitaj, and Aboul-Ella Hassanien, eds.), vol. 7918, 2013, pp. 173-188). The security parameter n determines the message digest length m, and n influences the size of private key, public key, and signature. The Winternitz parameter w may be used to control a trade-off between speed and signature size. A greater value of w implies a smaller signature, but slower speeds and vice versa. Typically w is chosen as a power of 2 within {4, 16, 256}, as this allows for easy transformation of bit strings into base-w encoded strings. Further define:

$$\ell_1 = \lceil m/\log_2(w) \rceil, \ell_2 = \lfloor \log_2(\ell_1(w-1)/\log_2(w)) \rfloor + 1 \text{ and } \ell = \ell_1 + \ell_2.$$

An uncompressed WOTS⁺ private key, public key, and signature includes $\ell$ blocks of n bits each.

An m-bit message digest of a message M, $H_M$ may be re-written to its base-w representation. The result is a length $\ell_1$ vector of integers $h_i \in [0, w-1]$. Each of these integers defines a chain length in the message (hash) chains. The checksum of $H_M$ is defined as $C_M = \sum_{i=1}^{\ell_1}(w-1-h_i)$, which may be represented as a length $\ell$ vector of base-w values $C_M=(c_1, \ldots, c_{\ell_2})$, with $c_i \in [0, w-1]$. These hash chains may be called the checksum (hash) chains. This checksum is necessary to prevent message forgery because an increase in at least one $h_i$ leads to a decrease in at least one $c_i$ and vice-versa. Using these $\ell$ integers as chain lengths, the function $\mathcal{H}$ is applied to the private key elements. This leads to $\ell$ n-bit values that make up the signature. For a received message and signature, the verifier can recompute the checksum, derive the chain lengths, apply $\mathcal{H}$ iteratively to complete each chain to its full length w, and compute a candidate WOTS+ public key. This can then be compared to the n-bit public key.

Because a WOTS+ signature can only be used once, XMSS combines WOTS+ key pairs into a Merkle tree structure. A Merkle tree is a binary-tree-graph structure in which leaf-nodes (the lowermost layer) correspond to public keys of WOTS+, which are in turn constructed using hash functions.

FIG. 1 illustrates a tree 100 corresponding to 8 OTS public-private key pairs. The tree 100 may be a binary-hash-tree such as a Merkle tree. In a high level description, the nodes 115$_{xx}$ of this tree 100 include n-bit hash values. The lowest layer (i.e., for h=0 the leaves of the tree 115$_{0x}$) includes the hashed OTS public keys of the OTS keypairs 105$_x$. The public key of the Merkle-tree scheme is then the root node 110 of the tree 100, which is constructed by taking pair-wise hashes of tree nodes 105, starting from the leaves, until 1 node remains at height h=3 (the node 110 in FIG. 1).

When signing a message, the signer signs with a (previously unused) OTS keypair 105, and sends the OTS signature of their message, along with the corresponding authentication path to the verifier. This authentication path allows a verifier to verify an OTS signature against the public key of the Merkle-tree-based scheme instead of against the OTS public key.

Figure 2:
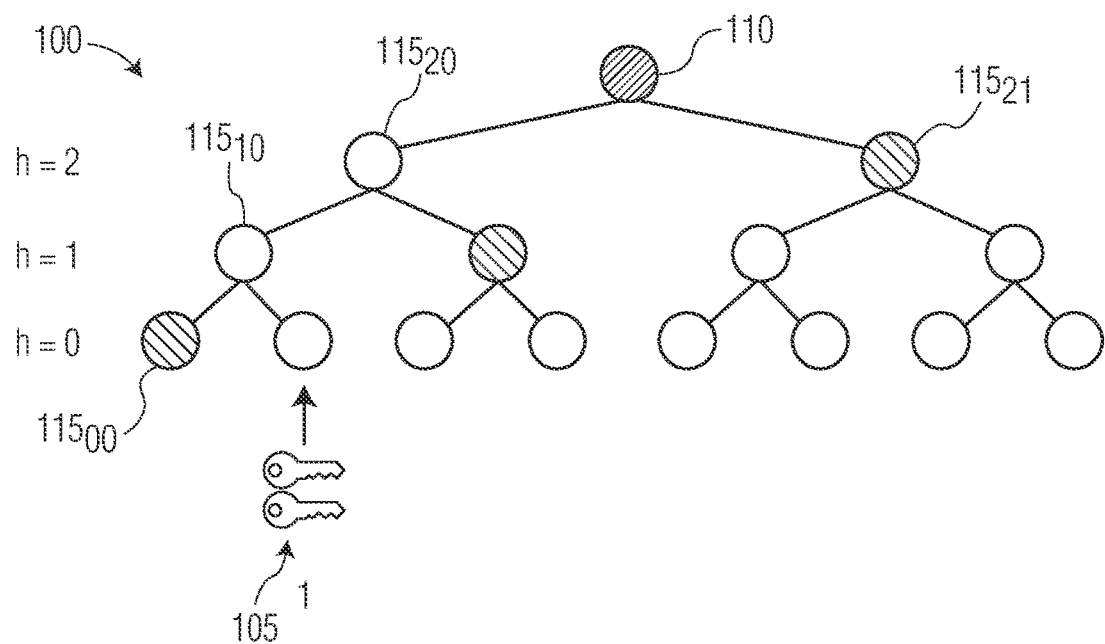
FIG. 2 illustrates an example for the authentication path of the second OTS keypair.

FIG. 2 illustrates an example for the authentication path of the second OTS keypair $105_1$. The authentical path includes nodes $115_{00}$, $115_{11}$, and $115_{21}$. Given the signature, the verifier may then compute the candidate root key as follows. First, they compute the OTS public key (PK) from the OTS signature and apply a hash to construct the corresponding Merkle tree leaf. Then they can apply in order a pairwise hash with the elements of the provided authentication path including nodes $115_{00}$, $115_{11}$, and $115_{21}$. If the result matched the public key at node 110, the signature is verified.

For the signer, computing the authentication path is a computation-intensive task. If they start from just their OTS secret keys (often stored in the form of a SEED), then they have to re-compute most Merkle tree leaf nodes (the most expensive part) to be able to compute the authentication path. Alternatively they could store the entire Merkle tree in memory, but for parameter sets of interest (h=10, 15 or even 20) this means storing more than 50 kB, or even MBs.

Given the signature, the verifier can then compute the candidate root key with the provided WOTS+ signature and the authentication path. Strategies for the signer on how and when the authentication path should be computed vary but are not that important for this embodiment. What should be noted is that: 1) the computation of the authentication path involves the computation of WOTS+ public keys, and therefore of WOTS+ chains; and 2) the authentication path can be computed independently from the current WOTS+ signature.

Note that with XMSS, LMS is the second stateful hash-based algorithm that has been standardized. It functions the same as XMSS in the broad lines described here but makes some different low-level design decisions. The embodiments described herein apply to it as well, but for ease of describing the embodiments, XMSS will be used in the description.

Additionally Sphincs+ is a stateless hash-based digital signature algorithm. It was recently announced to be standardized by NIST and the embodiments described herein applies to Shpincs+ as well. This scheme works slightly differently, because it is stateless, but still carries out WOTS+ signatures as its underlying signature scheme.

For all three signature schemes, the iterative application of a hash function $\mathcal{H}$ is the dominating factor in the computation cost of a signature verification. In the case of an embedded device, verifying a signature could thus be sped up by a dedicated hardware design for the computations of these hash chains.

Dedicated hardware or software design for XMSS largely relies on parallelization. This can be SIMD instructions as was described in U.S. patent application Ser. No. 17/243,058 (the '058 application), filed Apr. 28, 2021, entitled "Speeding up Hash-chain Computations" (which is hereby incorporated by reference for all purposes as if included herein). Alternatively, this can be the use of multiple hardware hash acceleration cores as is for instance described in Jan Philipp Thomas and Tim Giineysu, A configurable hardware implementation of xmss, Cryptology ePrint Archive, Paper 2021/352, 2021, eprint.iacr.org.

These operations have in common that they allow computation k>1 hash operations in parallel fast. They gain even more performance if the chaining property is leveraged. In this case, k chains of length m may be computed in one-shot, allowing k·m hashes to be computed fast. This however brings with it that for XMSS not all key generation, signing and verification operations will be divided into a nice multiple of k·m hashes.

For instance, for common parameters there are 67 parallel independent WOTS+ chains to be computed. If the most efficient SIMD operation parallelizes c=8 WOTS+ length m chains, then you need 9 times 8·m SIMD instructions, which could compute 72m hashes while only needing to compute 67m: this "wastes" almost 7 percent of the computational hashing power.

In the method of chained hash function calculation described herein, a method to optimize usage of the available hash acceleration by using these useless, or "superfluous" extra computations to compute for subsequent signature operations is described. Although for many digital signature schemes like ECDSA it is not possible to perform useful computations for the next signature to be signed without knowing the message, the unique property of (stateful) hash-based signatures is utilized to use the available hash acceleration usefully and completely and thereby speeding up signature generation in (stateful) hash-based signatures.

Figure 3:
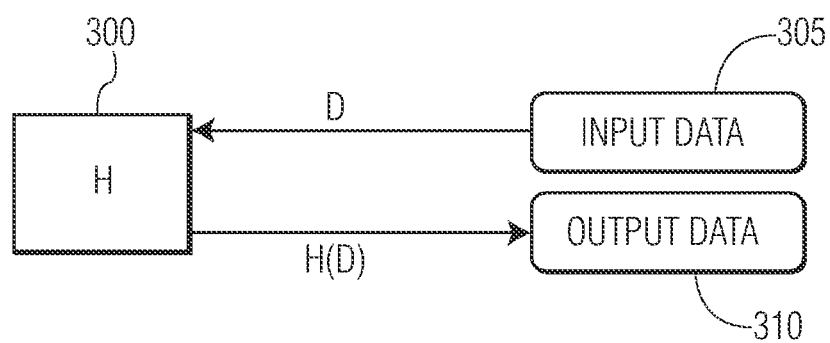
FIG. 3 illustrates the standard operation of a hash function.

The main computational operation in hash-based signature schemes is computing the cryptographic hash function. Examples include the standardized SHA-256 or SHAKE algorithms. Typically, these hash computations are performed by either calling the target hash function implemented in software on the input data and retrieving the output data from the software library, or by calling a hardware hash accelerator present on the embedded device to perform the same series of actions. FIG. 3 illustrates the standard operation of a hash function. The hash function 300 receives input data D 305 and produces output data H(D) 310. The hash function 300 may be implemented in software on a processor. The processor may be a general purpose processor or a special purpose processor that is optimized to more efficiently compute the hash function 300. In other embodiments, the hash function 100 may be implemented in hardware in order to optimize the operation of the hash function.

These computations in XMSS the to-be-computed hashes typically follow this structure:

procedure SUPERSIMPLIFIEDSIGN(x)
   for i = 1 to d do
      for j = 1 to $\ell$ do $$y_{i,j} = \underbrace{\mathcal{H}(\mathcal{H}(\ldots \mathcal{H}(x_{i,j})\ldots))}_{m\,times}$$

return y

Where the parameter d is the number of subtrees (d=1 for the regular XMSS) and $\ell$ as defined in the preliminaries. This means they have these three properties:

Concurrent execution. The large number of hash computations can be divided into independent subsets which can be operated on independently. The $d\cdot\ell = d\cdot(\ell_1 + \ell_2)$ computations are independent and could be executed concurrently. For example, a typical setting in practice is for w=16 and one has $\ell_1$=64 and $\ell_2$=3 such that m∈ {0, . . . w−1};

Chained hashing. The m hash computations performed in the inner loop are all chained. This means that the input of the (i+1)-st iteration is the output of the i-th one; and Small inputs. The overwhelming majority of hash-computations performed is on small inputs where small means 96 bytes for one of the recommended parameter sets.

The combination of these properties may be exploited for acceleration. As was put forth in the '058 application, specialized hardware may first be used to create an instruction which operates following the single instruction, multiple data (SIMD) paradigm: given k (different) inputs, the instruction computes the small-input hash computation on all of the inputs and returns the output.

Figure 4:
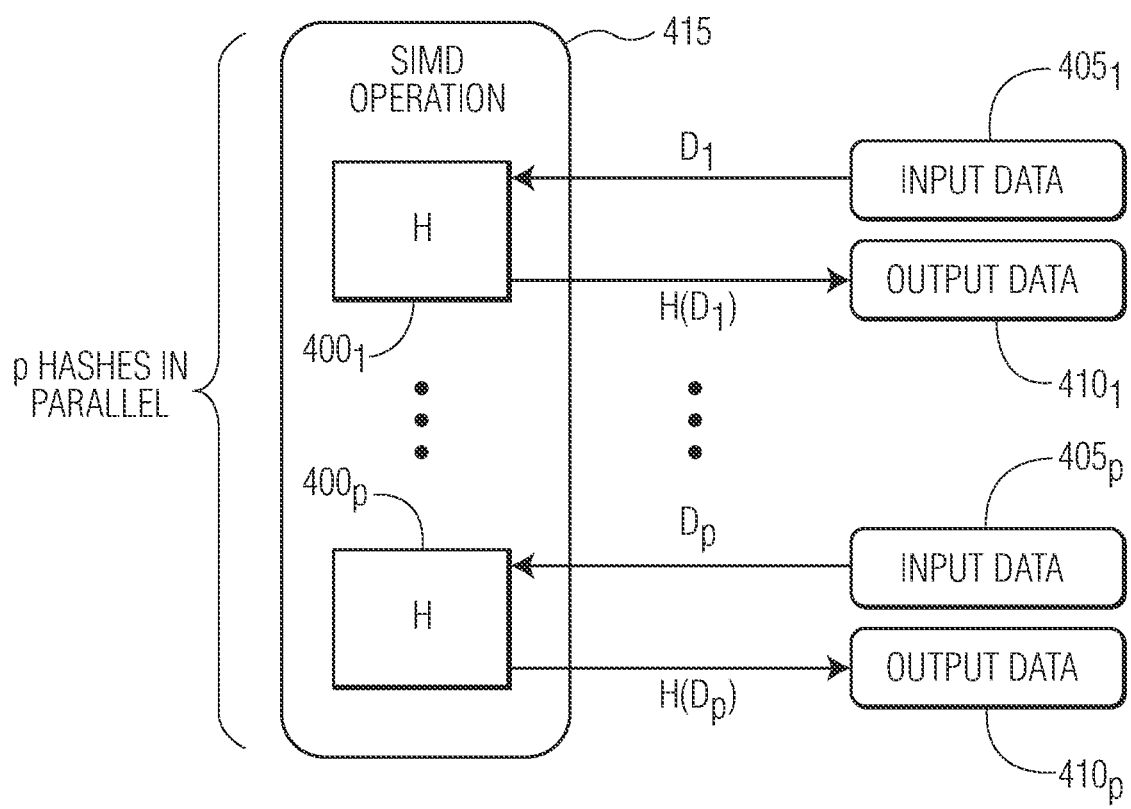
FIG. 4 illustrates a processor that implements a SIMD operation that performs the hash function in parallel on p inputs.

FIG. 4 illustrates a processor that implements a SIMD operation that performs the hash function in parallel on p inputs. Specifically, a plurality of inputs, on which the hash function needs to be performed, may be broken up into sets of p inputs. These p inputs are input into the processor 415 to carry out a SIMD instruction. The processor 415 implements p instances of the hash function $400_1$ to $400_p$. Each instance of the hash function 400 receives corresponding inputs $D_1$ to $D_p$ ($405_1$ to $405_p$) and produces outputs $H(D_1)$ to $H(D_p)$ ($410_1$ to $410_p$). This results in $d \cdot \ell \cdot m$ calls to the hash function to be reduces to $[d \cdot \ell \cdot m/p]$ calls to the hash function using SIMD operations, which allows for the calculation of the hashes to be completed more quickly.

Next, in the '058 application, it was posed that the fact that many computations are chained may also be exploited. By adding k small data units to the hardware computing the SIMD instruction enables one to simply compute only on this data unit. This allows very fast access and reduces memory latencies. Before the chain of operations start the user needs to load the input data to this data unit and retrieve this after the final computations. This is illustrated in FIG. 5.

Figure 5:
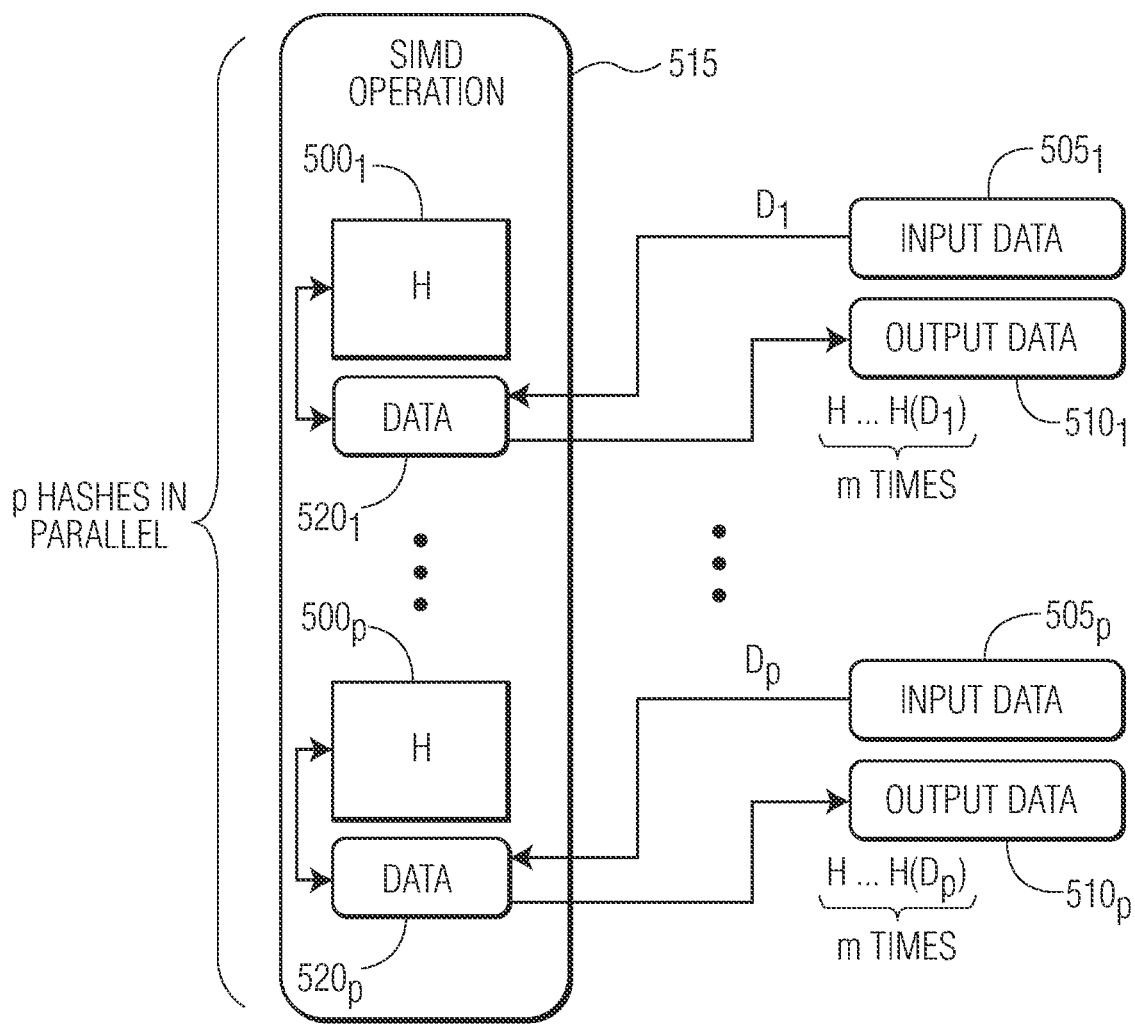
FIG. 5 illustrates a processor that implements a SIMD operation that performs the hash function in parallel on p inputs with data units to facilitate the calculation of chained hashes.

FIG. 5 illustrates a processor that implements a SIMD operation that performs the hash function in parallel on p inputs with data units $520_1$ to $520_p$ to facilitate the calculation of chained hashes. The data units $520_1$ to $520_p$ are a dedicated data storage or memory on the processor 515. Specifically, a plurality of inputs, on which the hash function needs to be performed, may be broken up into sets of p inputs. These p inputs are input into the processor 515. The processor 515 implements p instances of the hash function $500_1$ to $500_p$. Further, the processor 515 includes p instances of a data unit $520_1$ to $520_p$ where each of the data units $520_1$ to $520_p$ are associated with one of the hash functions 500. In other embodiments, a single data unit 520 may serve all of the hash functions 500 or a plurality of data units 520 may be present where each of the data units 520 serve more than one hash function 500. Each instance of the hash function receives corresponding inputs $D_i$ to $D_p$ ($505_1$ to $505_p$) and produces output $H(H( \ldots H(D_1) \ldots ))$ to $H(H( \ldots H(D_p) \ldots ))$ ($510_1$ to $510_p$). Before the chain of operations start the user loads the input data into the data unit(s) 520. The outputs are then retrieved from the data unit(s) 520 after the final computations in the chain.

This works great if all the k parallel computations need to perform the same number of m computations (the length of the chain). This is, unfortunately, extremely unlikely in practice. One cannot simply stop computing with one of the streams inside the SIMD computation as this violates the design principle of SIMD. In the '058 application, it was posed that this can be solved by either equating the input to the output value (and thereby wasting a free or superfluous hash computation), or to chunk the computation up into multiple instructions (and thereby increasing the memory latencies). An alternative approach will be described herein to take advantage of this excess processing capability.

Superfluous hashes can be found in large and small quantities in XMSS. Suppose we have an optimized hardware or software implementation that can perform k concurrent hashes efficiently. In practice, as shown before, one could compute $d \cdot \ell$ independent hash-chains of length m. In the best possible scenario $d \cdot \ell$ is a multiple of k and one can compute the outcome with $(d \cdot \ell \cdot m)/k$ calls to this parallel implementation. However, in practice this is not likely. Moreover, it might be the case that not all chain-lengths have the same length. This more generic situation (though still simplified) would look like:

--- procedure SIMPLIFIEDSIGN(x)

for i = 1 to d do for j = 1 to $\ell$ do $$y_{i,j} = \underbrace{\mathcal{H}(\mathcal{H}( \ldots \mathcal{H}(x_{i,j}) \ldots ))}_{m_{i,j} \text{ times}} y$$

---

Also note that even though it is an unlikely scenario that in a straightforward WOTS+ signature the m values of the chains match, there are fault attack countermeasures that perform a verification operation after a signing operation. In this case each chain will be fully computed to m. The first case is the focus in the remainder of the description, but the technique can work for both cases.

The idea of the hash-based signature method is to utilize the identified hashes of previous round of computation of authentication paths of the next signature. As mentioned before, the authentication path is part of the XMSS signature along with the WOTS+ signature, however unlike the WOTS+ signature, the authentication path of the XMSS signature may be computed independently from the message. The hash-based signature therefore entails the use of the superfluous hashes of XMSS signature s−1 efficiently for the authentication path computation of signature s (or even the authentication path of s−1 itself if this was not already computed).

As a pre-step to computing a signature s, the precomputed chain values would be loaded from the memory along with any other authentication path auxiliary data. Then any remaining computations for the signature are performed. This leads to better performance because it requires less hashes and includes, if there is space for superfluous hashes, precomputing part of the authentication path of signature s+1.

Assume an implementation can compute k hash-chains of length m in parallel. For the ease of in describing the hash-base signature assume that $2\ell > k$ (otherwise the algorithm still applies but indexing is a bit more involved). Then the computation presented before:

--- procedure SUPERSIMPLIFIEDSIGN(x)

for i = 1 to d do for j = 1 to $\ell$ do $$y_{i,j} = \underbrace{\mathcal{H}(\mathcal{H}( \ldots \mathcal{H}(x_{i,j}) \ldots ))}_{m \text{ times}}$$

return y is computed using:

```
procedure DUMMYSIGN(x)
    for i = 1 to ⌊(d·ℓ)/k⌋ do
        {y_{i,j}} = parallel − ℋ({x_{i,j}})
```

Create an input X where the first $d \cdot \ell \bmod k$ entries contain the remaining input data and the last $k-(d \cdot \ell \bmod k)$ input entries contain dummy data $$\{y_{d,j}\} = \text{parallel} - \mathcal{H}(\{x_{i,j}\})$$

return y

The idea is to avoid wasting resources and already compute hash chains from the next signature as:

```
procedure NOWASTESIGN(x)
    load the previously stored p < k output chains as y_{1,1}, ..., y_{1,p}
    for i = 1 to ⌊(d·ℓ−p)/k⌋ do
        {y_{i,j}} = parallel − ℋ({x_{i,j}})
```

Figure 6:
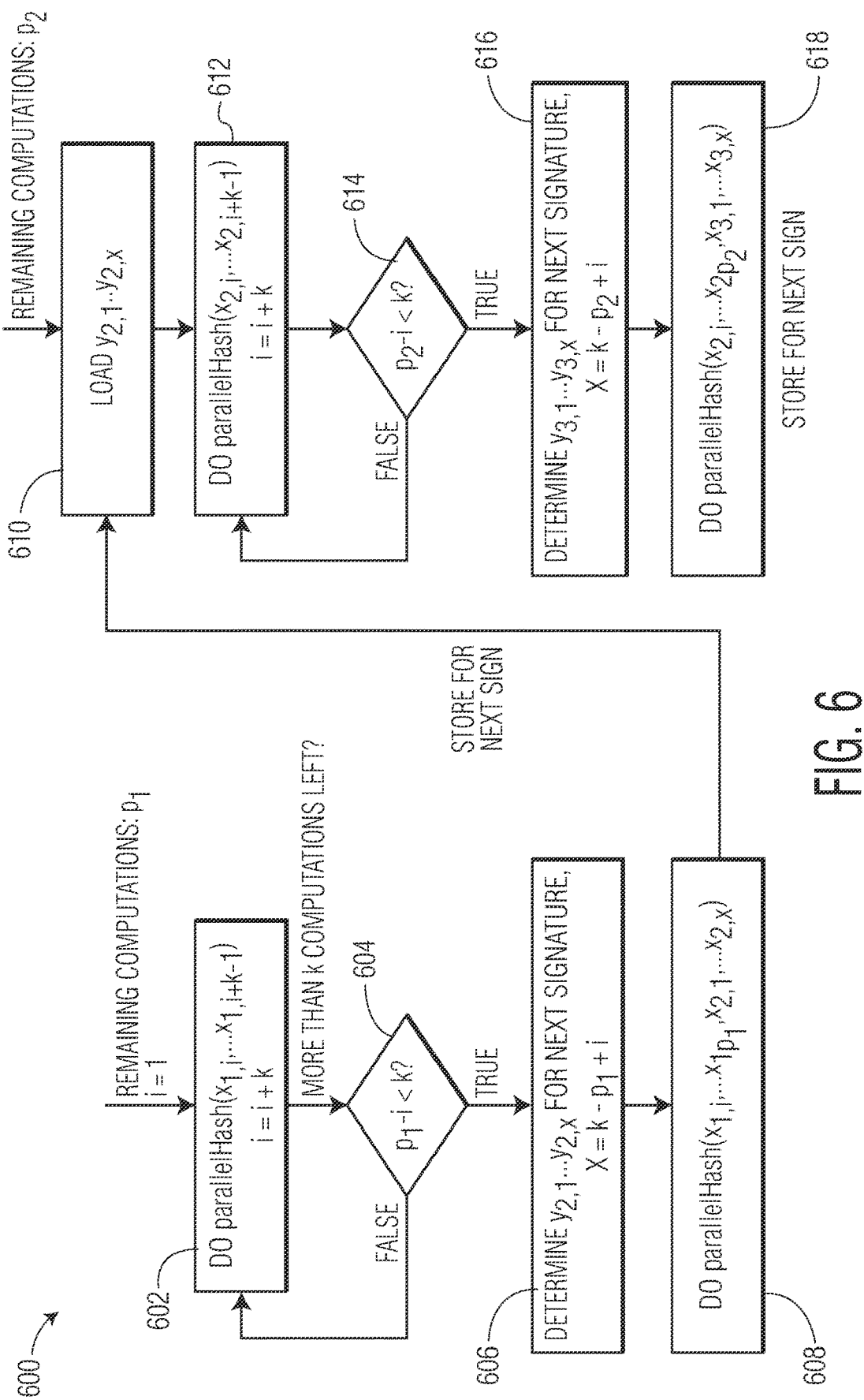
FIG. 6 illustrates a flow diagram of the signing method.

Create an input X where the first $(d \cdot \ell - p \bmod k)$ entries contain the remaining input data and the last $k-(d \cdot \ell - p \bmod k)$ input entries contain chains for the next signature, compute $$\{y_{d,j}\} = \text{parallel} - \mathcal{H}(\{x_{i,j}\})$$

store the last $k-(d \cdot \ell - p \bmod k)$ entries from $y_{d,j}$ for the next call's stored chains FIG. 6 illustrates a flow diagram of the signing method. FIG. 6 illustrates a few iterations of using the parallel hash function to carry out the signing without any wasted calculations in the parallel hash function. The signing method 600 starts by receiving the value $p_1$ and by initializing the counter i to 1. When the signing method 600 starts, $p_1$ will be the total number of calculations needed to be done for the current signature. Then the signing method 600 starts looping over the $x_{1,i}$ values using the parallelHash function to calculate $y_{1,i}$ chained hash outputs. In step 602 parallelHash$(x_{1,i}, \ldots x_{1,i+k-1})$ is calculated and then the value of i is incremented by k, where k is the number of parallel hashes computed by the parallelHash function. Then at step 604 it is determined if the value $p_1-i$ (which indicates the number of remaining parallel hashes that need to be calculated) is less than k. If not, then another k parallel hashes can be performed so step 602 is repeated. If so, then there are not enough remaining $x_{1,i}$ values (remainder($p_1$/k) to fill the parallel hash function, so the signing method 600 continues to step 606. At step 606 the number of calculations $y_{2,1} \ldots y_{2,X}$ that will be needed from the next signature calculation to have k hashes to be calculated by the parallel hash function is determined. Then at step 608 parallelHash$(x_{1,i}, \ldots x_{1,p_1}, x_{2,1}, \ldots x_{2,X})$ is calculated that spans a first and second signature calculation and allows for the parallelHash function to perform k parallel hashes without wasting any calculations of the parallellHash function. The hashes $y_{2,1} \ldots y_{2,X}$ on $x_{2,1}, \ldots x_{2,X}$ can then be stored for the next signing calculation.

The signing method 600 then loads at step 612 the previously calculated $y_{2,1} \ldots y_{2,X}$. The value $p_2$ indicates the total number of hashes that need to be calculated for the second signature calculation. The counter i is initialized to X+1 to account for the hashes from the second signature calculation that were calculated in the previous call to the parallelHash function.

Then the signing method 600 again starts looping over the $x_{2,i}$ values using the parallelHash function to calculate $y_{2,i}$ chained hash outputs. In step 612 parallelHash$(x_{2,i}, \ldots x_{2,i+k-1})$ is calculated and then the value of i is incremented by k, where k is the number of parallel hashes computed by the parallelHash function. Then at step 614 it is determined if the value $p_2-i$ (which indicates the number of remaining parallel hashes that need to be calculated) is less than k. If not, then another k parallel hashes can be performed so step 612 is repeated. If so, then there are not enough remaining $x_{2,j}$ values (remainder($p_2$/k)) where remainder is the remainder of the division) to fill the parallel hash function, so the signing method 600 continues to step 616 where the number of calculations $y_{3,1} \ldots y_{3,X}$ that will be needed from the next signature calculation to have k hashes to be calculated by the parallel hash function. Then at step 618 parallelHash$(x_{2,i}, \ldots x_{2,p_2}, x_{3,1}, \ldots x_{3,X})$ is calculated that spans a second and third signature calculation and allows for the parallelHash function to perform k parallel hashes without wasting any calculations of the parallellHash function. The hashes $y_{3,1} \ldots y_{3,X}$ on $x_{3,1}, \ldots x_{3,X}$ can then be stored for the next signing calculation. This process then repeats for additional signatures.

As mentioned in the above, although this the description of the hash-based signature is written as applied to the stateful hash-based signature scheme(s) XMSS(/LMS), it may be applied to stateless schemes like Sphincs+ as well. Sphincs+, like XMSS and LMS works by taking few-time signatures (a variant of a one-time signature like WOTS+) and combining them in a large Merkle tree structure in which trees are signed by WOTS+ signatures of other trees. Since Sphincs+ is stateless, it is not possible to predict the which will be the next few time signatures to sign the next message.

However, for Sphincs+ authentication paths do have to be computed on-the-fly during signing, which involves computing many WOTS+ public keys from the Sphincs+ secret key. This means that within 1 Sphincs+ signature hashbashed signature may still be applied by using the superfluous hashes on WOTS+ (or other one/few-time signature) key generation or signature to speed up the next WOTS+ (or other one/few-time signature) key generation or signature. This means an overall speed-up for the Sphincs+ algorithm.

The performance gain and memory overhead of the hash-based signature will now be discussed. Storing the precomputed chain values would incur some overhead, but we can reduce it by utilizing the XMSS structure again. The WOTS+ public key is constructed as HASH $(c_0, c_1, \ldots, c_\ell)$, where the $c_0, \ldots$ are the last entries of the WOTS+ chains. The Hash function works as a sponge and we can compute and store HASH$(c_0, \ldots, c_p)$ during the computation of signature s and complete it in the computation of signature s+1 to HASH $(c_0, c_1, \ldots, c_\ell)$ by "appending" HASH $(c_{p+1}, \ldots, c_\ell)$. This means that we only need to store one or two hash or hash-state values using the hash-based signature, which does not have a large impact for most use cases.

The performance gain of the hash-bases signature will depend a lot on the complexity of the hardware and software used. With higher k the gain will be higher than if k=2 or 3. Additionally it will depend on the parameters of XMSS; hash-base signature will have a higher gain for less and longer chains than for many and short chains. However, for the example of 67 chains and parallelization capacity for 8 concurrent chains previously discussed, the gain is about 7% for the second signature and 4-7% for the signatures thereafter.

As used herein, the term "non-transitory machine-readable storage medium" will be understood to exclude a transitory propagation signal but to include all forms of volatile and non-volatile memory. When software is implemented on a processor, the combination of software and processor becomes a single specific machine. Although the various embodiments have been described in detail, it should be understood that the invention is capable of other embodiments and its details are capable of modifications in various obvious respects.

Because the data processing implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

Any combination of specific software running on a processor to implement the embodiments of the invention, constitute a specific dedicated machine.

It should be appreciated by those skilled in the art that any block diagrams herein represent conceptual views of illustrative circuitry embodying the principles of the invention.

What is claimed is:

1. A data processing system comprising instructions embodied in a non-transitory computer readable medium, the instructions, when executed, cause a processor to perform a digital signature method, the digital signature method comprising:

performing $p_1/k$ iterations of a parallel chained hash function for a first signature calculation to produce a first signature, wherein $p_1$ is a total number of chained hashes to be calculated for the first signature and k is a number of parallel hashes performed by the parallel chained hash function; performing the parallel chained hash function on remaining remainder($p_1/k$) chained hashes from the first signature calculation and X=k−remainder($p_1/k$) chained hashes from a second signature calculation; and performing $(p_2−X)/k$ iterations of the parallel chained hash function for the second signature calculation to produce a second signature, wherein $p_2$ is a total number of chained hashes to be calculated for the second signature; and sending a message with at least one of the first signature and/or the second signature as an output to a device for verification.

2. The data processing system of claim 1, further comprising instructions for performing the parallel chained hash function on remaining remainder($p_2/k$) chained hashes from the second signature calculation and X=k−remainder($p_2/k$) chained hashes from a third signature calculation.

3. The data processing system of claim 1, further comprising loading the X chained hashes from the second signature calculation before performing $(p_2−X)/k$ iterations of the parallel chained hash function for the second signature calculation.

4. The data processing system of claim 1, further comprising combining the X chained hashes from the second signature calculation and storing the combination of the X chained hashes from the second signature calculation.

5. The data processing system of claim 4, further comprising loading the combined X chained hashes from the second signature calculation before performing $(p_2−X)/k$ iterations of a parallel chained hash function for the second signature calculation.

6. The data processing system of claim 1, wherein the digital signature implements a hash-based signature using a graph structure and a one-time signature scheme.

7. The data processing system of claim 1, wherein performing the parallel chained hash function comprises:

receiving a single instruction and a plurality of small data inputs, wherein the single instruction instructs a processor to perform the parallel chained hash function on the plurality of small data inputs;

for each of the small data inputs in parallel computing a chained hash function on the small data inputs, wherein in the chained hash function includes a plurality of rounds:

applying the chained hash function to each of the small data inputs in a first round to produce an output; and applying the chained hash function to the output of a previous round in a second to last round.

8. A digital signature method executed by a hardware processor of a computing device, the digital signature method comprising: performing $p_1/k$ iterations of a parallel chained hash function for a first signature calculation to produce a first signature, wherein $p_1$ is a total number of chained hashes to be calculated for the first signature and k is the number of parallel hashes performed by the parallel chained hash function;

performing the parallel chained hash function on remaining remainder($p_1/k$) chained hashes from the first signature calculation and X=k−remainder($p_1/k$) chained hashes from a second signature calculation; and performing $(p_2-X)/k$ iterations of the parallel chained hash function for the second signature calculation to produce a second signature, wherein $p_2$ is a total number of chained hashes to be calculated for the second signature; and sending a message with at least one of the first signature and/or the second signature as an output to a device for verification.

9. The digital signature method of claim 8, further comprising performing the parallel chained hash function on remaining remainder($p_2$/k) chained hashes k from the second signature calculation and X=k−remainder($p_2$/k) chained hashes from a third signature calculation.

10. The digital signature method of claim 8, further comprising loading the X chained hashes from the second signature calculation before performing $(p_2-X)/k$ iterations of the parallel chained hash function for the second signature calculation.

11. The digital signature method of claim 8, further comprising combining the X chained hashes from the second signature calculation and storing the combination of the X chained hashes from the second signature calculation.

12. The digital signature method of claim 11, further comprising loading the combined X chained hashes from the second signature calculation before performing $(p_2-X)/k$ iterations of the parallel chained hash function for the second signature calculation.

13. The digital signature method of claim 8, wherein the digital signature implements a hash-based signature using a graph structure and a one-time signature scheme.

14. The digital signature method of claim 8, wherein performing the chained parallel hash function comprises:
  receiving a single instruction and a plurality of small data inputs, wherein the single instruction instructs a processor to perform the parallel chained hash function on the plurality of small data inputs;
  for each of the small data inputs in parallel computing a chained hash function on the small data inputs, wherein in the chained hash function includes a plurality of rounds:
  applying the chained hash function to each of the small data inputs in a first round to produce an output; and
  applying the chained hash function to the output of a previous round in a second to last round.

15. A data processing system comprising instructions embodied in a non-transitory computer readable medium, the instructions, when executed, cause a processor to perform a digital signature method, the digital signature method comprising: performing one or more first iterations of a parallel chained hash function to produce a first signature, wherein the performing of the one or more first iterations causes a first total number of chained hashes to be calculated for the first signature using a number of parallel hashes; sending a first message including the first signature for verification; performing the parallel chained hash function on first remainder chained hashes from the first signature calculation and second remainder chained hashes from a second signature calculation to produce precomputed chain values for a second signature; performing one or more second iterations of the parallel chained hash function for the second signature calculation, wherein a second total number of chained hashes for the second signature calculation is less than the first total number of chained hashes by a number of the precomputed chain values; and sending a second message including the second signature for verification.

16. The data processing system of claim 15, further comprising instructions that cause the processor to perform the digital signature method further comprising performing the parallel chained hash function on the second remainder chained hashes from the second signature calculation and third remainder chained hashes from a third signature calculation to produce second precomputed chain values.

17. The data processing system of claim 15, wherein the digital signature method further comprises loading the precomputed chain values of the second signature calculation before performing the one or more second iterations of the parallel chained hash function for the second signature calculation.

18. The data processing system of claim 15, wherein the digital signature method further comprises combining the precomputed chain values of the second signature calculation and storing the combination of the precomputed chain values.

19. The data processing system of claim 15, wherein the digital signature method comprises producing a hash-based signature using a graph structure and a one-time signature scheme.

20. The data processing system of claim 15, wherein performing the parallel chained hash function comprises:
  receiving a single instruction and a plurality of small data inputs, wherein the single instruction instructs a processor to perform the parallel chained hash function on the plurality of small data inputs;
  for each of the small data inputs in parallel computing a chained hash function on the small data inputs, wherein in the chained hash function includes a plurality of rounds:
  applying the chained hash function to each of the small data inputs in a first round to produce an output; and
  applying the chained hash function to the output of a previous round in a second to last round.

* * * * *